US00RE38500E

(19) United States
(12) Reissued Patent
Kameyama et al.

(10) Patent Number: US RE38,500 E
(45) Date of Reissued Patent: Apr. 20, 2004

(54) POLARIZER, OPTICAL ELEMENT, LIGHTING DEVICE AND LIQUID CRYSTAL DISPLAY

(75) Inventors: Tadayuki Kameyama, Osaka (JP); Hisashi Mihara, Osaka (JP); Hironori Motomura, Osaka (JP); Naoki Takahashi, Osaka (JP)

(73) Assignee: Nitto Denko Corporation, Osaka (JP)

(21) Appl. No.: 10/151,007

(22) Filed: May 21, 2002

Related U.S. Patent Documents

Reissue of:
(64) Patent No.: 6,166,790
Issued: Dec. 26, 2000
Appl. No.: 09/168,901
Filed: Oct. 9, 1998

(30) Foreign Application Priority Data

Oct. 9, 1997 (JP) ..... 9-293277
Oct. 29, 1997 (JP) ..... 9-314501
Sep. 3, 1998 (JP) ..... 10-267465

(51) Int. Cl.[7] ..... G02F 1/1335; C09K 19/02
(52) U.S. Cl. ..... 349/96; 349/98; 349/175; 349/185
(58) Field of Search ..... 349/96, 98, 175, 349/183, 185

(56) References Cited

U.S. PATENT DOCUMENTS 4,725,460 A 2/1988 Matsuo et al.
5,332,522 A 7/1994 Chen et al.
5,386,306 A 1/1995 Gunjima et al.
5,418,631 A 5/1995 Tedesco
5,506,704 A 4/1996 Broer et al.
5,627,666 A 5/1997 Sharp et al.
5,695,682 A 12/1997 Doane et al.
5,796,454 A 8/1998 Ma
5,825,444 A 10/1998 Broer et al.
5,847,798 A 12/1998 Yang et al.
5,858,268 A 1/1999 Niiyama et al.
5,875,012 A 2/1999 Crawford et al.
5,999,243 A 12/1999 Kameyama et al.

FOREIGN PATENT DOCUMENTS

EP 0 606 939 7/1994
WO WO 96/02016 1/1996

OTHER PUBLICATIONS

Patent Abstracts of Japan, vol. 095, No. 005, Jun. 30, 1995.
Patent Abstracts of Japan, vol. 098, No. 001, Jan. 30, 1998.
Patent Abstracts of Japan, vol. 013, No. 382, Aug. 24, 1989.

*Primary Examiner*—Tarifur R. Chowdhury
(74) *Attorney, Agent, or Firm*—Sughrue Mion, PLLC

(57) ABSTRACT

Disclosed are (1) a polarizer having a function of separating incident light into polarized light through reflection and transmission, which has (a) a haze of 10% or less, or (b) a ratio of parallel transmitted light to incident light of 40 to 60%, (c) a ratio of mirror reflected light to the incident light of 25% or more, (d) a ratio of diffusion reflected light to the incident light of 20% or less or (e) a fraction of mirror reflected light to the whole reflected light of 60% or more; (2) an optical element comprising the polarizer, and a ¼ wavelength formed by one or two or more retardation layers disposed on at least one side thereof; (3) a lighting device comprising a surface light source, and the polarizer or the optical element disposed thereon; and (4) a liquid crystal display comprising the lighting device and a liquid crystal cell arranged on the light outgoing side thereof, with a polarizing plate intervening therebetween.

44 Claims, 2 Drawing Sheets

POLARIZER, OPTICAL ELEMENT, LIGHTING DEVICE AND LIQUID CRYSTAL DISPLAY

Matter enclosed in heavy brackets [ ] appears in the original patent but forms no part of this reissue specification; matter printed in italics indicates the additions made by reissue.

FIELD OF THE INVENTION

The present invention relates to a polarizer suitable for improving the luminance of a liquid crystal display and preventing the uneven display thereof, and an optical element and a lighting device using the same.

BACKGROUND OF THE INVENTION

Conventionally, as polarizers which can overcome the disadvantage of polarizing plates that about half of incident light is absorbed to result in absorption loss, thereby improving the luminance of liquid crystal displays, elements comprising laminated products of cholesteric liquid crystal layers and ¼ wavelength plates have been known. In these elements, circularly polarized light transmitted through the cholesteric liquid crystal layers is converted to linearly polarized light by the ¼ wavelength plates, and the linearly polarized light is allowed to be incident on the polarizing plates in agreement with polarization axes, thereby preventing absorption loss.

However, there is the problem that the luminance of the liquid crystal displays is not so much improved as expected, resulting in uneven display, probably because the linearly polarized light contains large amounts of light components absorbed by the polarizing plates. Further, when prism array layers are arranged for improving the luminance and the efficiency for light utilization by optical path control, there is also the problem that the luminance is largely reduced in a front direction (vertical direction).

SUMMARY OF THE INVENTION

It is therefore an object of the present invention to develop a polarizer, an optical element and a lighting device which can form polarized light having little absorption loss caused by a polarizing plate, can supply the polarized light to a liquid crystal cell with the excellent efficiency for incident light utilization, can form a liquid crystal display excellent in luminance and decreased in uneven display, and are little reduced in luminance in a front direction when a prism array layer is arranged.

According to the present invention, there is provided a polarizer having a function of separating incident light into polarized light through reflection and transmission, which has (a) a haze of 10% or less, or (b) a ratio of parallel transmitted light to incident light of 40 to 60%, (c) a ratio of mirror reflected light to the incident light of 25% or more, (d) a ratio of diffusion reflected light to the incident light of 20% or less or (e) a fraction of mirror reflected light to the whole reflected light of 60% or more.

Further, the present invention provides an optical element, in which a ¼ wavelength plate formed of at least one retardation layer is provided on the above-mentioned polarizer, and a polarizing plate containing a dichroic substance is disposed thereon if necessary.

Still further, the present invention provides a lighting device comprising the above-mentioned polarizer or optical element disposed on a surface light source.

Furthermore, the present invention provides a liquid crystal display in which a liquid crystal cell is arranged on the light outgoing side of the lighting device, with a polarizing plate intervening therebetween.

In the present invention, the term "parallel transmitted light" means transmitted light in the parallel state when parallel light is incident on a polarizer, and the term "diffusion transmitted light" means transmitted light not in the parallel state in the above-mentioned case. Further, the term "mirror reflected light" means light satisfying the reflective law, taking reflection by the whole polarizer as reflection based on the ideal mirror surface, and the term "diffusion reflected light" means light not satisfying the reflective law. Furthermore, the term "fraction of mirror reflected light" means the ratio of mirror reflected light to the whole reflected light, and is calculated by the following equation:

[mirror reflected light/(mirror reflected light+diffusion reflected light)]·100

The ratio of parallel transmitted light, (parallel transmitted light/incident light)·100, is hereinafter also referred to as the parallel light transmittance; the ratio of diffusion reflected light, (diffusion reflected light/incident light)·100, as the diffusion transmittance; the ratio of transmitted light, (the total transmitted light/incident light)·100, as the total light transmittance; the ratio of mirror reflected light, (mirror reflected light/incident light)·100, as the mirror reflectance; the ratio of diffusion reflected light, (diffusion reflected light/incident light)·100, as the diffusion reflectance; and the fraction of mirror reflected light as the mirror reflection fraction. In the above, incident light=transmitted light+diffused light, and transmitted light=parallel transmitted light+diffusion transmitted light.

The polarizer of the present invention is excellent in mass production and separation function of polarized light, and provides the polarized light having little absorption loss caused by the polarizing plate with the excellent efficiency for incident light utilization. Further, it can form the optical element and the lighting device little reduced in luminance in a front direction, and the liquid crystal display excellent in luminance and decreased in uneven display, even when the prism array layer is arranged.

Further, minimization of the dispersion of the haze, the parallel light transmittance, the total light transmittance, the diffusion transmittance, the mirror reflectance and the diffusion reflectance in a plane can reduce uneven display such as uneven color, in addition to homogenization of luminance, thereby forming the liquid crystal display having good brightness and visibility.

The above-mentioned effects are based on the specified values of the haze, the parallel light transmittance, the mirror reflectance, the diffusion reflectance or the mirror reflection fraction, and the mirror reflectance, the diffusion reflectance and the mirror reflection fraction result from the following elucidation. That is to say, as a result of intensive investigation for solving the above-mentioned problems, the present inventors have elucidated that when a cholesteric liquid crystal layer having a constant thickness is combined with a ¼ wavelength plate to form an optical element, the mirror reflectance, the diffusion reflectance and the mirror reflection fraction of the cholesteric liquid crystal layer have an influence on the luminance, and are largely related to the total reflectance, (reflected light/incident light)·100.

That is to say, the cholesteric liquid crystal layer shows mirror reflection characteristics containing no diffusion reflected light by surface reflection on both sides of the layer, when not oriented. However, the reflectance is low, and the total reflectance increases by orientation. It is therefore possible to obtain half of incident visible light as reflected light for natural light (the total reflectance: 50%). However, in the course of an increase in the total reflectance, diffusion reflected light is generated to form reflected light in which the diffusion reflected light and mirror reflected light are present as a mixture. Moreover, the mixing ratio thereof changes with an increase in the total reflectance.

With respect to the above-mentioned change, the diffusion reflectance increases and the mirror reflectance decreases, probably because the diffusion reflected light is predominantly generated at the beginning of an increase in the total reflectance. On the other hand, when the total reflectance further increases, the mirror reflected light is probably predominantly generated in its turn. Consequently, the mirror reflected light starts to increase while the diffusion reflectance is decreasing, reaching the mixing ratio giving the mirror reflectance higher than the diffusion reflectance.

The present inventors have elucidated that the polarizer having a mirror reflectance of 25% or more, a diffusion reflectance of 20% or less or a mirror reflection fraction of 60% or more is effective for an improvement in luminance in the above-mentioned change in the mixing ratio. Based thereon, it is conceivably advantageous to show reflection characteristics of the light containing a large amount of mirror reflected light and a small amount of diffusion reflected light, in terms of effective utilization of the light bringing about an improvement in luminance. Further, the present inventors have also elucidated that the in-plane scatter of the above-mentioned mirror reflectance, diffusion reflectance or mirror reflection fraction contributes to uneven luminance or uneven color. The degree of the uneven luminance or uneven color caused by the scatter is more increased in an oblique direction than in a front (vertical) direction. The uneven display or uneven color can be largely decreased by reducing the above-mentioned scatter to 10% or less for the mirror reflectance or the diffusion reflectance, and to 15% or less for the mirror reflection fraction.

DETAILED DESCRIPTION OF THE INVENTION

The polarizer according to the present invention has a function of separating incident light into polarized light through reflection and transmission, and has (a) a haze of 10% or less, or (b) a ratio of parallel transmitted light to incident light of 40 to 60%, (c) a ratio of mirror reflected light to the incident light of 25% or more, (d) a ratio of diffusion reflected light to the incident light of 20% or less or (e) a fraction of mirror reflected light to the whole reflected light of 60% or more.

Figure 1:
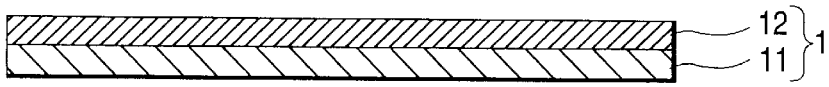
FIG. 1 is a cross sectional view showing a polarizer embodying the present invention.

Examples of the above-mentioned polarizers are shown in FIG. 1. The reference numeral 1 indicates a layer having a function of separating incident light into polarized light through reflection and transmission (circularly polarized light separation layer). The reference numeral 11 indicates a supporting substrate, and the reference numerals 12 and 13 indicate cholesteric liquid crystal layers.

When the polarizer is applied to a liquid crystal display in combination with a ¼ wavelength plate, the luminance can be stably improved and the uneven display can be reduced, compared with a liquid crystal display using no polarizer, by satisfying the above-mentioned haze, parallel light transmittance, mirror reflectance, diffusion reflectance or mirror reflection fraction. Further, when a prism array layer is arranged, a reduction in luminance in a front direction can be decreased.

In terms of an improvement in luminance, prevention of the uneven display, and prevention of a reduction in luminance in the front direction when the prism array layer is arranged, the haze is preferably 8% or less, and particularly 5% or less; the parallel light transmittance is preferably 42 to 60%, and particularly 45 to 55%; the mirror reflectance is preferably 30% or more, and particularly 35% or more; the diffusion reflectance is preferably 15% or less, and particularly 10% or less; and the mirror reflection fraction is preferably 70% or more, and particularly 75% or more.

Further, in respect to the above-mentioned improvement in luminance, the ratio of transmitted light to incident light, namely the total light transmittance, is preferably 40 to 65%, more preferably 42 to 60%, and most preferably 45 to 55%; or the ratio of diffusion reflected light to incident light, namely the diffusion reflectance, is preferably 10% or less, more preferably 8% or less, and most preferably 5% or less.

Furthermore, in terms of prevention of the uneven display such as the uneven luminance or uneven color, particularly prevention of the uneven display in an oblique direction, the in-plane scatter of the polarizer is preferably 6% or less, more preferably 5% or less, and most preferably 4% or less, for the haze; preferably 15% or less, more preferably 12% or less, and most preferably 8% or less, for the parallel light transmittance; preferably 10% or less, more preferably 8% or less, and most preferably 5% or less, for the mirror reflectance and the diffusion reflectance; or preferably 15% or less, more preferably 10% or less, and most preferably 7% or less, for the mirror reflection fraction.

In addition, in respect to the above-mentioned prevention of the uneven luminance, the in-plane scatter of the polarizer is preferably 15% or less, more preferably 12% or less, and most preferably 8% or less, for the total light transmittance; or preferably 6% or less, more preferably 4% or less, and most preferably 3% or less, for the diffusion transmittance.

The polarizer may be formed of an appropriate material having the function of separating incident light into polarized light through reflection and transmission, for example, a cholesteric liquid crystal oriented layer. According to the above-mentioned cholesteric liquid crystal oriented layer, the circularly polarized light separation layer which separates natural light into right circularly polarized light and left circularly polarized light through reflection and transmission can be obtained.

The above-mentioned cholesteric liquid crystal shows the circularly polarized light separation function different in wavelength characteristics, based on the difference in helical pitch of Grandjean orientation. In the present invention, however, the circularly polarized light separation layer may be a circularly polarized light separation layer having an appropriate form, such as a circularly polarized light separation layer changing in helical pitch in the direction of thickness, a circularly polarized light separation layer composed of a laminated product of two or more cholesteric liquid crystal layers different in center wavelengths of reflected light, or a circularly polarized light separation layer, a combination of the above-mentioned layers, in which two or more cholesteric liquid crystal polymer layers are laminated with each other in the long-short order based on the center wavelength of reflected light, the circularly polarized light separation layer changing in helical pitch in the direction of thickness.

The lamination of the above-mentioned cholesteric liquid crystal layers changing in helical pitch in the direction of thickness or different in center wavelengths of reflected light, accordingly different in helical pitch, aims at the enlargement of the wavelength region of the separation function. That is to say, a constantly oriented monolayer cholesteric liquid crystal layer usually has a limitation on the wavelength region showing selective reflection (circularly polarized light dichromatism), and the limitation is in a wide range extending to a wavelength region of about 100 nm in some cases. However, even such a wavelength range does not extend to the entire region of visible light desired when applied to liquid crystal displays. It is therefore aimed that the changing range of helical pitch is widened to enlarge the wavelength region showing the circularly polarized light dichromatism. By the way, several types of cholesteric liquid crystal polymer layers having a center wavelength of selective reflection ranging from 300 to 900 nm, which are different in helical pitch, are laminated by using a combination of layers reflecting circularly polarized light in the same direction, thereby being able to efficiently form a circularly polarized light separation layer which can cover the visible light region. The lamination of the cholesteric liquid crystal layers reflecting the circularly polarized light in the same direction makes a phase state of circularly polarized light reflected by each layer uniform to prevent the generation of a different polarized state in each wavelength region and to increase the amount of polarized light in an available state.

In the above-mentioned circularly polarized light separation layer, the lamination of the cholesteric liquid crystal layers in the long-short order based on the center wavelength of reflected light aims at prevention of changes in color of transmitted light caused by visual angle changes. In this case, a layer structure in which two or more cholesteric liquid crystal layers having the same helical pitch are contained, such as a form in which one or two or more cholesteric liquid crystal layers different in helical pitch intervene between the cholesteric liquid crystal layers having the same helical pitch in the long-short order based on the above-mentioned center wavelength, is also allowed.

For formation of the circularly polarized light separation layers, low-molecular weight cholesteric liquid crystals can be used. However, cholesteric liquid crystal polymers can be preferably used from the standpoints of handling and reduced thickness of the resulting polarizers. In this case, the polarizers can be obtained as monolayer products such as cholesteric liquid crystal polymer films, or as multilayer products in which they are supported with plastic films or the like. From the viewpoint of the enlargement of the visual angle with a good visibility in liquid crystal displays, the polarizers are preferred in which the cholesteric liquid crystal polymers are Grandjean-oriented with defects such as domains decreased.

There is no particular limitation on the cholesteric liquid crystal polymers, and appropriate polymers may be used. Accordingly, various polymers can be used such as main chain type or side chain type polymers in which conjugate linear atomic groups (mesogens) are introduced into main chains or side chains of the polymers.

The cholesteric liquid crystal polymers having larger retardation ($\Delta n$) become wider in the wavelength region of selective reflection, and are preferably used in respect to a decrease in the layer number and allowance to a wavelength shift at a wide visual angle. As the liquid crystal polymers, polymers having a glass transition temperature of 30 to 150° C. are preferably used from the standpoints of handling and stability of orientation at operating temperatures.

By the way, examples of the above-mentioned main chain type liquid crystal polymers include polymers such as polyesters, polyamides, polycarbonates and polyesterimides, in which mesogen groups comprising para-substituted cyclic compounds are linked by spacer moieties for giving flexibility if necessary.

Examples of the side chain type liquid crystal polymers include polymers having polyacrylates, polymethacrylates, polysiloxanes or polymalonates as main chains and low-molecular weight liquid crystal compounds (mesogen groups) comprising para-substituted cyclic compounds as side chains through spacer moieties comprising conjugate linear atomic groups (mesogens) if necessary, nematic liquid crystal polymers containing low-molecular weight chiralities, chiral component-introduced liquid crystal polymers, and mixed liquid crystal polymers of nematic and cholesteric polymers.

As described above, even the polymers having the para-substituted cyclic compounds imparting nematic orientation comprising para-substituted aromatic units or substituted cyclohexyl ring units such as azomethine, azo, azoxy, ester, biphenyl, phenylcyclohexane and bicyclohexane forms can be converted to polymers having cholesteric orientation by introducing appropriate chiral components comprising compounds having asymmetric carbon atoms or low-molecular weight chiralities (JP-A-55-21479 and U.S. Pat. No. 5,332,522). Terminal substituent groups at the para-positions of the para-substituted cyclic compounds may be appropriate groups such as cyano, alkyl and alkoxyl groups.

The spacer moieties include, for example, methylene chains $—(CH_2)_n—$ and polyoxymethylene chains $—(CH_2CH_2O)_m—$. The number of repetition of structural units forming the spacer moieties is appropriately determined by the chemical structure of the mesogen moieties. In general, n is 0 to 20, and particularly 2 to 12, for the methylene chains, and m is 0 to 10, and particularly 1 to 3, for the polyoxymethylene chains.

The circularly polarized light separation layers composed of the cholesteric liquid crystal polymers can be formed by methods based on the conventional orientation treatment of the low molecular weight liquid crystals. Examples of such methods include a method of developing a cholesteric liquid crystal polymer on an appropriate oriented film such as an oriented film obtained by rubbing with a rayon cloth a polyimide, polyvinyl alcohol, polyester, polyarylate, polyamideimide or polyether imide film formed on a supporting base material, an obliquely deposited layer or an oriented film obtained by the drawing treatment, followed by heating at a temperature equal to or higher than a glass transition temperature to lower than an isotropic phase transition temperature, and cooling the polymer to a temperature of lower than the glass transition temperature in a state in which liquid crystal polymer molecules are Grandjean-oriented to obtain a glass state, thereby forming a solidified layer in which the orientation is fixed.

As the above-mentioned supporting substrates, appropriate materials can be used which include monolayer, laminated or oriented films composed of plastics such as triacetyl cellulose, polyvinyl alcohol, polyimides, polyarylates, polyesters, polycarbonates, polysulfones, polyethersulfones, amorphous polyolefins, modified acrylic polymers and epoxy resins, and glass plates. The plastic films are preferred in respect to a decrease in thickness.

The liquid crystal polymers can be developed, for example, by methods in which solutions of the liquid crystal polymers in solvents are developed in thin layers by appropriate methods such as spin coating, roll coating, flow coating, printing, dip coating, cast film formation, bar coating and gravure printing, followed by drying as needed. As the above-mentioned solvents, appropriate solvents such as methylene chloride, cyclohexanone, trichloroethylene, tetrachloroethane, N-methylpyrrolidone and tetrahydrofuran can be used.

The liquid crystal polymers can also be developed by methods in which heated melts of the liquid crystal polymers, preferably heated melts showing isotropic phases, are developed in accordance with the above, further developed in thin layers while maintaining the melting temperature if necessary, and then solidified. These methods use no solvents, and therefore provide hygienic working environment.

The heating treatment for orienting developed layers of the liquid crystal polymers can be conducted by heating the layers within the temperature range from the glass transition temperature to the isotropic phase transition temperature, namely within the temperature range in which the liquid crystal polymers exhibit liquid crystal phases, as described above. Further, the oriented state can be fixed by cooling the layers to less than the glass transition temperature, and there is no particular limitation on the cooling conditions. Usually, the above-mentioned heat treatment can be conducted at a temperature of 300° C. or less, so that the natural cooling system is generally employed. Various additives such as stabilizers, plasticizers and metals can be added to the developing solutions of the cholesteric liquid crystal polymers as needed.

The thickness of the solidified layers of the liquid crystal polymers formed on the supporting substrates is preferably 0.5 to 50 $\mu$m, more preferably 1 to 30 $\mu$m, and most preferably 2 to 10 $\mu$m in terms of prevention of disorder of orientation and a reduction in transmittance, and the width of the wavelength region of selective reflection. The solidified layers of the liquid crystal polymers formed on the supporting substrates can be used either as integrated with the supporting substrates or as films separated therefrom. When the supporting substrates are contained, the total thickness including the substrates is preferably 2 to 500 $\mu$m, more preferably 5 to 300 $\mu$m, and most preferably 10 to 200 $\mu$m.

The above-mentioned circularly polarized light separation layer changing in helical pitch in the direction of thickness can be produced, for example, by pressing two or more oriented cholesteric liquid crystal polymer layers on each other under heating. For such a heat pressing treatment, an appropriate method can be employed such as a method of heat pressing cholesteric liquid crystal polymer layers by means of a heat pressing means such as a roll laminator at a temperature equal to or higher than a glass transition temperature to lower than an isotropic phase transition temperature.

When the solidified layers of the liquid crystal polymers are used as integrated with the supporting substrates, the solidified layers are laminated with each other in the close contact state based on the above, thereby obtaining the circularly polarized light separation layers changing in helical pitch in the direction of thickness, in its turn, the polarizers according to the present invention.

The circularly polarized light separation layers changing in helical pitch in the direction of thickness may show the continuous wavelength region of reflected light or the discontinuous wavelength region of reflected light. From the viewpoint of prevention of the uneven color, the circularly polarized light separation layers which can be preferably used in the present invention are layers showing the continuous wavelength region of reflected light. Such a circularly polarized light separation layer can be produced, for example, by heating a laminated product of the cholesteric liquid crystal polymer layers formed by the above-mentioned heat pressing operation at a temperature equal to or higher than the glass transition temperature to lower than the isotropic phase transition temperature to form a layer in which the cholesteric liquid crystal polymers forming upper and lower layers are mixed with each other in a close contact interface thereof.

In the above, the cholesteric liquid crystal polymer layer formed by mixing the cholesteric liquid crystal polymers of the upper and lower layers forms the circularly polarized light separation layer in which the upper layer differs from the lower layer in helical pitch and the helical pitch varies in multiple stages in the direction of thickness. Usually, the helical pitch is a mean value for the cholesteric liquid crystal polymers forming the upper and lower layers, and the cholesteric liquid crystal polymer layer forms the region showing the continuous wavelength region of reflected light, together with the upper and lower layers.

Accordingly, when the cholesteric liquid crystal polymer layers are used in such a combination that the wavelength region of the upper layer does not overlap with that of the lower layer, namely, in such a combination that the wavelength region of reflected light has a missing region due to discontinuity, the cholesteric liquid crystal polymer layers formed by mixing the upper and lower layers can fill up the above-mentioned missing region to make the wavelength of reflected light continuous.

Accordingly, for example, the use of two kinds of cholesteric liquid crystal polymer layers having reflected wavelength regions of 500 nm or less and equal to or more than 600 nm, respectively, can provide a circularly polarized light separation layer which reflects light in the wavelength region of 500 to 600 nm, the discontinuous reflected wavelength region. This means that the circularly polarized light separation layer showing a wider reflected wavelength region can be formed by lamination of less cholesteric liquid crystal polymer layers.

The polarizers of the present invention, particularly, the polarizers having the circularly polarized light separation layers, can be preferably used for the fabrication of liquid crystal displays. In that case, the polarizers can also be used as optical elements in each of which a ¼ wavelength plate having one or two or more retardation layers is added to at least one side thereof. Examples of the optical elements are shown in FIGS. 2 and 3, wherein the reference numeral 2 indicates a ¼ wavelength plate, the reference numerals 21 and 22 indicate retardation layers, and the reference numeral 3 indicates a polarizing plate.

Figure 2:
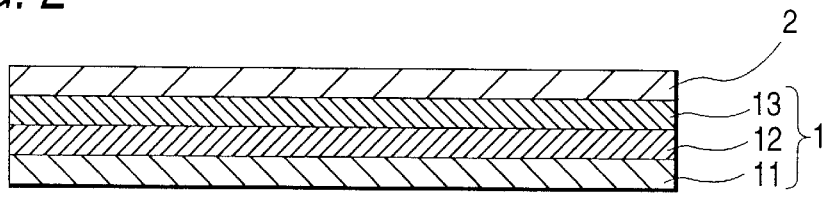
FIG. 2 is a cross sectional view showing an optical element embodying the present invention.
Figure 3:
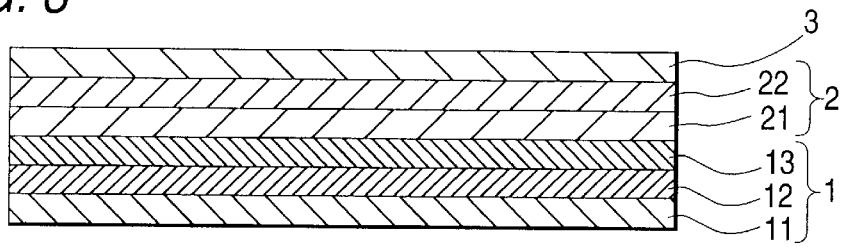
FIG. 3 is a cross sectional view showing another optical element embodying the present invention.

The ¼ wavelength plate is used, as shown in FIGS. 2 and 3, for linearly polarizing circularly polarized light transmitted through the circularly polarized light separation layer 1, and formed by one or two or more retardation layers. In respect to a reduction in the angle dependence of changes in color caused by visual angle changes, it is preferred that the retardation layer is arranged on the side of the cholesteric liquid crystal polymer layer in which the center wavelength of reflected light is longer, in the circularly polarized light separation layer.

As the ¼ wavelength plate (retardation layer), a plate having a front retardation of 100 to 180 nm is preferably used for the visible light region from the viewpoints of the linear polarization effect and the compensation of changes in color caused by obliquely transmitted light. That is to say, taking a maximum in-plane refractive index as $n_x$, a refractive index in a direction crossing at right angles thereto as $n_y$, a refractive index in a thickness direction as $n_z$, and a thickness as d, a ¼ wavelength plate satisfying the equation:

$$(n_x-n_y)d=\Delta nd=100-180$$

is preferably used.

The retardation layer used together with the above-mentioned retardation layer showing the ¼ wavelength plate function as needed is a compensation layer for allowing the color balance of light obliquely transmitted through the retardation layer showing the ¼ wavelength plate function to agree with the color balance of light vertically transmitted therethrough as close as possible, thereby giving neutral tints with less coloring when visually observed through the polarizing plate, and one having a front retardation (Δnd) of 100 to 720 nm is preferably used.

In the above, the retardation layers which can be preferably used for the compensation of changes in color are ones in which the refractive index in the direction of thickness is higher than one or both of the in-plane refractive indexes, or in which $N_z$ represented by the equation: $(n_x-n_z)/(n_x-n_y)$ is 5 or less, preferably 2 or less, more preferably 1.5 or less, and most preferably 1.1 or less (all include minus values).

The retardation layers can be formed of any materials, and preferred are ones excellent in transparency, particularly showing a light transmittance of 80% or more, and giving an uniform retardation. In general, there are used oriented films and liquid crystal polymers, particularly liquid crystal polymers of twisted orientation, formed of plastics such as polycarbonates, polyesters, polysulfones, polyethersulfones, polystyrene, polyolefins such as polyethylene and polypropylene, polyvinyl alcohol, cellulose acetate polymers, polyvinyl chloride, polyvinylidene chloride, polyarylates, polymethyl methacrylate and polyimides.

The above-mentioned retardation layers having a high refractive index in the direction of thickness can be produced by appropriate methods, for example, monoaxial or biaxial heat orientation of films formed by extruding the above-mentioned polymers by appropriate methods such as casting methods and extrusion methods, in the state in which the films are adhered to heat-shrinkable films.

The above-mentioned characteristics such as Δnd and $N_z$ of the retardation layers can be controlled by changing the materials or the thickness of the films, or the conditions such as the degree of orientation or the orienting temperature. The general thickness of the retardation layers is 10 to 500 μm, and particularly 20 to 200 μm, for monolayer ones, but is not limited thereto.

When the retardation layers such as the ¼ wavelength plates are formed by use of liquid crystal polymers, they can be obtained in appropriate forms such as oriented films of the liquid crystal polymers and oriented layers thereof supported by transparent substrates, in accordance with the case of the above-mentioned circularly polarized light separation layers. When the liquid crystal polymers are used, the desired retardation layers can also be obtained without orientation treatment.

The ¼ wavelength plates may be either monolayer retardation layers or laminated products of two or more retardation layers different in retardation, as described above. The lamination of the retardation layers different in retardation is effective for the enlargement of the wavelength range in which they function as the desired ¼ wavelength plates and compensation plates. When the retardation layers are laminated, it is preferred from the above-mentioned viewpoint that one or two or more retardation layers in which the refractive index in the direction of thickness is higher than at least one of the in-plane refractive indexes are arranged.

From the effect of improving the luminance, it is preferred that the polarizers are ones which transmit linearly polarized light having a specified polarization axis and reflect the other light. In the polarizer, a polarizing plate 3 can also be arranged on a ¼ wavelength layer 2, as shown in FIG. 3. In this case, the polarizer can be applied to the liquid crystal cell as such without use of a separate polarizing plate.

As the polarizing plates, appropriate plates such as absorption type polarizing plates containing dichroic substances, oriented polyene films and said films provided with transparent protective layers can be used. By the way, examples of the absorption type polarizing plates include hydrophilic polymer films such as polyvinyl alcohol films, partially formalized polyvinyl alcohol films and partially saponified ethylene-vinyl acetate copolymer films, and films allowed to adsorb dichroic substances such as iodine and dichroic dyes and then oriented. Further, examples of the oriented polyene films include dehydrated products of polyvinyl alcohol, and dehydrochlorinated products of polyvinyl chloride. The thickness of the polarizing plates is usually 5 to 80 μm, but is not limited thereto.

In the fabrication of the liquid crystal displays, polarizing plates high in the degree of polarization such as absorption type polarizing plates containing dichroic substances are preferably used for attaining bright display, namely transmitting light highly linearly polarized by means of the ¼ wavelength plates through the polarizing plates while preventing absorption loss as effectively as possible to obtain display of a good contrast ratio by incidence of the highly linearly polarized light to the liquid crystal cells. In particular, dichroic substance-containing absorption type polarizing plates having a light transmittance of 40% or more and a degree of polarization of 95.0% or more, particularly 99% or more are preferably used.

The above-mentioned transparent protective layers are provided particularly for the purpose of protecting polarizing plates poor in water resistance such as the dichroic substance-containing absorption type polarizing plates, and may be formed by appropriate methods such as coating of plastics and lamination of films. When the protective layers are formed by separated materials such as films, it is preferred from the viewpoint of prevention of reflection loss that the polarizing plates are integrally laminated with them by means of adhesive layers. The thickness of the transparent protective layers, which may be appropriately determined, is generally 1 mm or less, particularly 500 μm or less, and more particularly 1 to 300 μm. As the plastics, appropriate plastics may be used. However, the plastics illustrated in the above-mentioned retardation layers and transparent substrates for supporting the liquid crystal polymers are generally used.

Further, fine unevenness can also be formed on surfaces of the transparent resin layers by addition of fine particles. As the fine particles, particles showing transparency in transparent resin layers are used. Examples of such fine particles include inorganic fine particles having a mean particle size of 0.5 to 5 $\mu$m, which may be conductive, such as silica, alumina, titania, zirconia, tin oxide, indium oxide, cadmium oxide and antimony oxide, and organic fine particles such as crosslinked or non-crosslinked polymers. The content of the fine particles is generally 2 to 25% by weight, and preferably 5 to 20% by weight.

When the polarizing plate is disposed on the ¼ wavelength plate, the arrangement angle of a polarization axis of the polarizing plate to the ¼ wavelength plate can be appropriately determined according to retardation characteristics of the ¼ wavelength plate, or characteristics of circularly polarized light incident thereon. However, in terms of an improvement in the efficiency for light utilization, it is preferred that a transmitting axis of the polarizing plate is arranged in as parallel as possible to a polarizing direction (oscillating direction) of the linearly polarized light through the retardation layer.

The polarizer according to the present invention separates light from a light source such as natural light into right circularly polarized light and left circularly polarized light as reflected light and transmitted light through the polarizer, and linearly polarizes the circularly polarized light and elliptically polarized light transmitted through the polarizer, by means of the ¼ wavelength plate, to supply the linearly polarized light to the polarizing plate.

Figure 4:
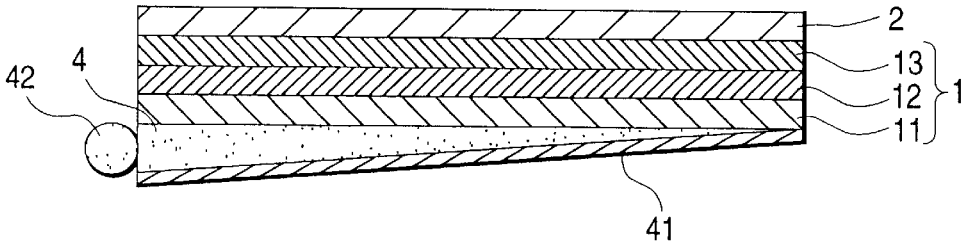
FIG. 4 is a cross sectional view showing a lighting device embodying the present invention.
Figure 5:
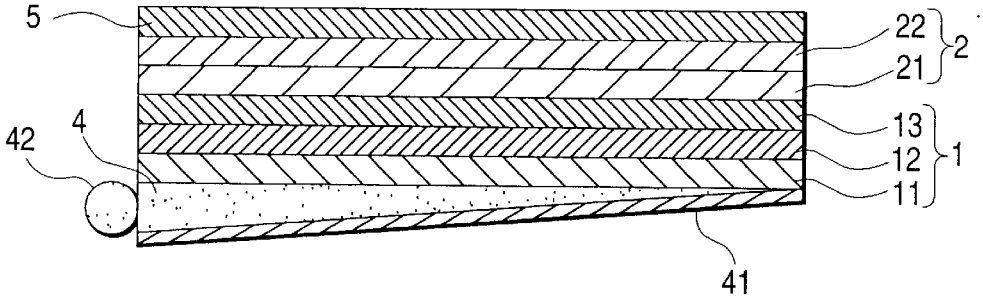
FIG. 5 is a cross sectional view showing another lighting device embodying the present invention.

Accordingly, as shown in FIGS. 4 and 5, such a polarizer or optical element is arranged on an appropriate light conductive plate 4 such as a side light type light conductive plate or an EL lamp, thereby being able to assemble a lighting device suitable for a back light of a liquid crystal display. The surface light source illustrated in the figures is provided with a light source 42 on the side of the light conductive plate 4.

According to the above-mentioned lighting device illustrated in the figures, light from the light source 42 is incident on a side face of the light conductive plate 4 and goes out from a surface of the light conductive plate by reflection at a back face. The outgoing light is transmitted as specified circularly polarized light (vertical) or elliptically polarized light (oblique) through a circularly polarized light separation layer 1 arranged on the surface side of the light conductive plate, and linearly polarized through a ¼ wavelength plate 2, thus being incident on a polarizing plate 3. On the other hand, light reflected by the circularly polarized light separation layer 1 as circularly polarized light other than the specified is incident on the light conductive plate again, reflected by means of a reflecting layer 41 arranged on the back face, and incident on the circularly polarized light separation layer 1 again as return light.

The above-mentioned light reflected by the circularly polarized light separation layer is changed in the polarized state when reflected by the back face of the light conductive plate, and converted to specified circularly polarized light which can be partly or wholly transmitted through the circularly polarized light separation layer. Accordingly, the light reflected by the circularly polarized light separation layer is confined between the circularly polarized light separation layer and the light conductive plate until it becomes the specified circularly polarized light which can be transmitted through the circularly polarized light separation layer, and reflection is repeated therebetween.

As described above, in the side light type light conductive plate, the reflected light is confined between the circularly polarized light separation layer and the reflecting layer of the light conductive plate, and reflection is repeated therebetween. In the meantime, the polarized state is changed to the state in which the light can be transmitted through the circularly polarized light separation layer, and the light goes out together with initial transmitted light of the incident light, thereby decreasing unused light due to reflection loss.

On the other hand, the light which has gone out from the circularly polarized light separation layer is converted to linearly polarized light or elliptically polarized light rich in linearly polarized light components through the ¼ wavelength plate. The converted light is little absorbed by and transmitted through the polarizing plate, when the linearly polarized light direction thereof agrees with the transmitting axis of the polarizing plate, thereby reducing unused light due to absorption loss. As a result, the light which has previously been lost as reflection loss and absorption loss can also be effectively used, and the efficiency for light utilization can be improved. As the surface light source, therefore, the side light type light conductive plate is preferably used.

As the above-mentioned light conductive plate, an appropriate one having a reflective layer on a back face and giving out light to the surface side can be used. Preferably, a light conductive plate effectively giving out light without absorption is used. An example thereof is a side light type back light known in a liquid crystal display, in which a linear light source such as a (cold or hot) cathode tube or a light source such as a light emitting diode is arranged on the side face of a light conductive plate 4, and light transmitted through the light conductive plate goes out to the surface side of the plate by diffusion, reflection, diffraction and interference.

In the above, the light conductive plate in which internal transmitted light goes out to one face side can be obtained, for example, by providing a light outgoing face or a back face of a transparent or translucent resin plate with a diffuser in the dot or stripe form, or giving an uneven structure, particularly a fine prism array-like uneven structure, to the back face of the resin plate.

The light conductive plate giving out light to the one face side can have the function that the plate itself converts the polarization of light reflected by the circularly polarized separation layer. However, the provision of the reflecting layer 41 on the back face of the light conductive plate can prevent reflection loss almost completely. The reflecting layer such as a diffusion reflecting layer or a mirror reflecting layer is excellent in the function to convert the polarization of light reflected by the circularly polarized separation layer, so that it is preferably used in the present invention.

By the way, in the diffusion reflecting layer represented by the uneven surface, the polarized state is randomly mixed based on its diffusion to cancel the polarized state. Further, in the mirror reflecting layer represented by a deposited layer of aluminum or silver, a resin plate provided therewith or a metal surface composed of metal foil, the polarized state is reversed by reflection of the circularly polarized light.

In the fabrication of the lighting device, a prism array layer 5 comprising a prism sheet for controlling the outgoing direction of light, a diffusing plate for obtaining uniform light emission, a reflecting means for returning leakage light, and an auxiliary means such as a light source holder for guiding outgoing light to the side face of the light conductive plate are arranged on the top, bottom or side face of the light conductive plate 4 in one or more layers as an appropriate combination if necessary, as described in FIG. 5.

In the above, dots given to the prism array layer or the diffusing plate arranged on the surface side (light-outgoing side) of the light conductive plate or given to the light conductive plate can function as a polarization-converting means changing the phase of reflected light by the diffusion effect. When two or more prism layers are arranged, it is preferred that prism arrays in each layer are arranged in the state in which the optical anisotropy is canceled by allowing the prism arrays to cross at right angles or intersect each other to shift the arrangement angle of the arrays.

In the present invention, respective parts such as the circularly polarized separation layers, the ¼ wavelength plates, the polarizing plates and the light conductive plates for fabricating the polarizers, the optical elements or the lighting devices can be integrally laminated by means of adhesive layers as needed. The integral lamination of the fabrication parts is effective for prevention of deterioration of indicated quality due to inhibition of reflection loss in each interface and prevention of invasion of foreign materials in each interface, and prevention of a reduction in compensating efficiency or polarization-converting efficiency caused by optical deviation. Accordingly, even when the circularly polarized separation layers, the ¼ wavelength plates, the polarizing plates and the light conductive plates are each formed in a plurality of layers, it is preferred that the respective layers are integrated in the close contact state by means of the adhesive layers.

Although appropriate adhesives can be used for the above-mentioned integral lamination, adhesive layers excellent in stress relaxation can be preferably used, among others, because they inhibit stress developed in the circularly polarized separation layers, the ¼ wavelength plates or the polarizing plates by heat from light sources to prevent changes in the refractive index generated by photoelastic deformation, thereby fabricating liquid crystal displays which are bright and excellent in visibility and reliability of indicated quality.

In the formation of the adhesive layers, transparent adhesives can be used which comprise appropriate polymers such as acrylic polymers, silicone polymers, polyesters, polyurethanes, polyethers and synthetic rubber. In particular, acrylic adhesives are preferably used in terms of optical transparency, adhesive characteristics and weather resistance. In order to prevent photoelastic deformation by relaxation of internal stress developed in laminated products by heat, it is preferred that the adhesive layers have a relaxation elasticity of $2\cdot10^5$ to $1\cdot10^7$ dyne/cm$^2$, particularly $2\cdot10^6$ to $8\cdot10^6$ dyne/cm$^2$.

The thickness of the adhesive layers may be appropriately determined. In general, it is 1 to 500 $\mu$m, preferably 2 to 200 $\mu$m, and more preferably 5 to 100 $\mu$m, in terms of adhesive strength and a reduction in thickness. The adhesive layers can contain tackifiers such as petroleum resins, rosin resins, terpene resins, cumarone indene resins, phenol resins, xylene resins and alkyd resins, softening agents such as phthalates, phosphates, paraffin chlorides, polybutene and polyisobutylene, or other appropriate additives such as various fillers and antioxidants.

The optical element obtained by integral lamination is formed by, for example, transferring an adhesive layer provided on a separator formed of a thin sheet such as a film surface-treated with a release agent onto an adhesive face of a polarizer, pressing a ¼ wavelength plate thereon, further similarly transferring an adhesive layer onto the ¼ wavelength plate, and arranging and pressing a polarizing plate thereon.

Further, the optical element can also be formed by transferring an adhesive layer provided on a separator onto an adhesive face of a light conductive plate, arranging and pressing a polarizer thereon, then similarly transferring an adhesive layer onto the polarizer, and pressing in turn a ¼ wavelength plate and an optional polarizing plate thereon, or by laminating adherends such as a polarizer, a ¼ wavelength plate, a polarizing plate and a light conductive plate by means of adhesive layers previously provided on specified adhesive faces in a specified order, and pressing them together by the press treatment.

In the polarizers, optical elements and lighting devices according to the present invention, appropriate optical layers such as light diffusing plates can also be arranged on their surfaces or in appropriate positions between layers. In that case, the optical layers may be integrally laminated with the polarizers by means of adhesive layers excellent in stress relaxation. Such a previously adhering method has the advantage that elements stabler in quality and more excellent in reliability can be obtained than those obtained by the sequentially adhering method in an assembly line.

In the present invention, the liquid crystal layers, the ¼ wavelength plates, the polarizing plates, the light conductive plates, the adhesive layers and other parts such as the optical layers for fabricating the polarizers, optical elements and lighting devices can also be treated with, for example, ultraviolet ray absorbers such as salicylate compounds, benzophenol compounds, benzotriazole compounds, cyanoacrylate compounds and nickel complex salt compounds to give ultraviolet ray absorbing ability.

As described above, the polarizer or optical element of the present invention is used in combination with an appropriate surface light source such as the side light type light conductive plate, prevents reflection loss by converting the polarization of circularly polarized light reflected by the circularly polarized separation layer to reuse it as outgoing light, prevents absorption loss by the polarizing plate by controlling the phase of the outgoing light by means of the ¼ wavelength plate to convert it to the state in which the linearly polarized light components transmittable through the polarizing plate are richly contained, and prevents changes in color to improve the luminance.

Accordingly, the polarizers and optical elements of the present invention can be used in back light systems of liquid crystal displays, because they are excellent in the efficiency for light utilization, can provide light easily transmittable through the polarizing plates, and can easily achieve a large displaying area. In that case, it is preferred that 65% or more, preferably 70% or more of linearly polarized light components transmittable through the polarizing plates as linearly polarized light and major-axial components of elliptically polarized light are contained, in order to utilize as a light source light going out from the ¼ wavelength plates.

Figure 6:
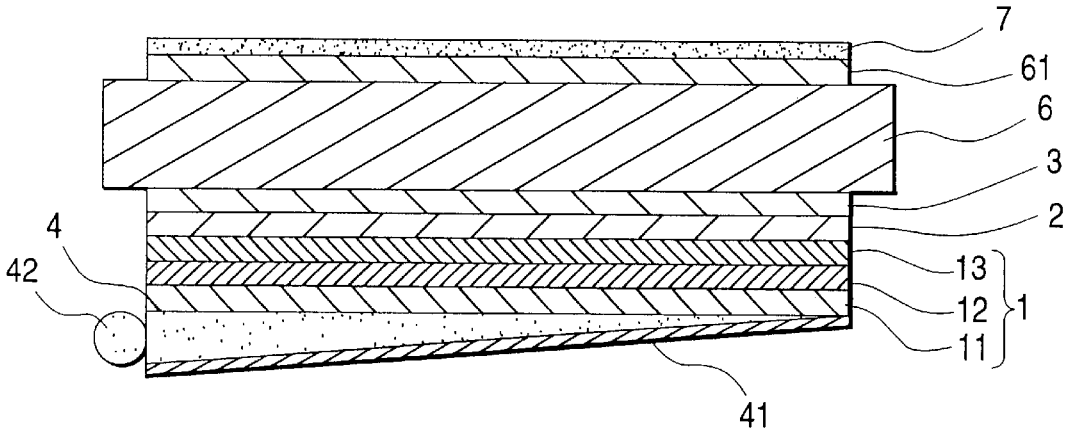
FIG. 6 is a cross sectional view showing a liquid crystal display embodying the present invention.
Figure 7:
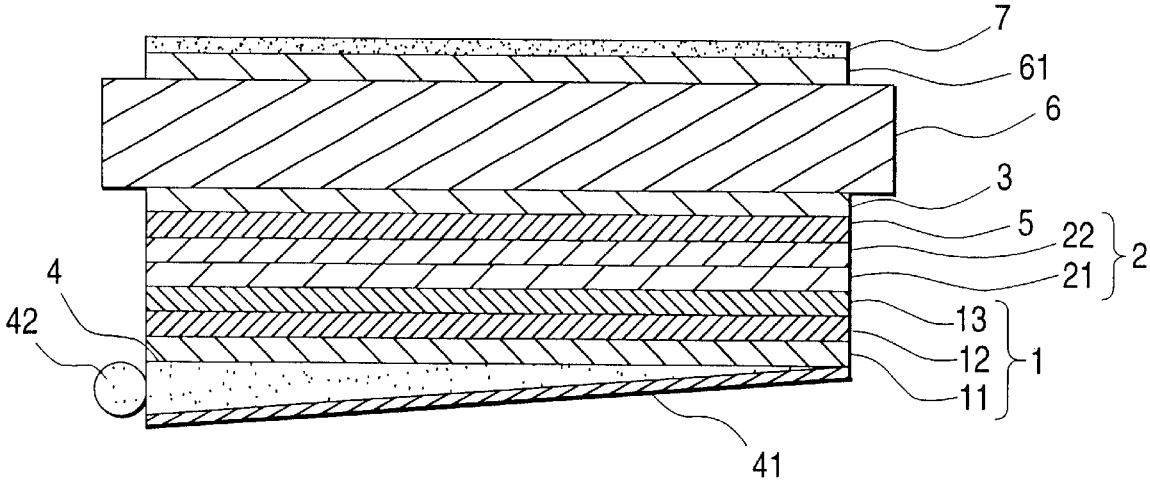
FIG. 7 is a cross sectional view showing another liquid crystal display embodying the present invention.

Embodiments of the liquid crystal displays using the lighting device of the present invention as a back light system are shown in FIGS. 6 and 7. Referring to the drawings, a liquid crystal cell 6 is arranged on the light outgoing side of a light conductive plate 4 forming the lighting device with the interposition of an optical element, and arranged on the side of a ¼ wavelength plate 2 of the optical element as shown in the drawings. In the drawings, the reference numeral 61 indicates a polarizing plate, and the reference numeral 7 indicates a light diffusing plate for visual light diffusion.

The polarizers and lighting devices of the present invention are particularly preferably used for the fabrication of liquid crystal displays each having the polarizing plates on both sides of the liquid crystal cell. When the optical element has a polarizing plate on the top side of the ¼ wavelength plate, the polarizing plate on the side where the optical element is provided in the liquid crystal cell can be omitted.

Liquid crystal displays are generally fabricated by appropriately assembling constituent parts such as polarizing plates, liquid crystal cells, back lights and optional retardation plates for compensation, and incorporating driving circuits. In the present invention, as described above, there is no particular limitation, except that the optical element or the lighting device is arranged on the visual back face side of the liquid crystal cell, directing the ¼ wavelength plate side thereof or the polarizing plate side thereof to the liquid crystal cell, and the liquid crystal display can be produced in accordance with conventional methods. However, it is preferred that the respective constituent parts are integrally adhered to one another by the adhesive layers.

Further, the optical elements and lighting devices of the present invention can be preferably used for liquid crystal cells to which light in the polarized state is required to be incident, such as cells using twist nematic liquid crystals or super twist nematic liquid crystals. However, they can also be used for liquid crystal cells using non-twist liquid crystals, guest host liquid crystals in which dichroic substances are dispersed, or ferroelectric liquid crystals.

In the fabrication of the liquid crystal display, appropriate optical layers such as a light diffusing plate, an anti-glare layer, a reflection reducing film, a protective layer and a protective plate provided on the polarizing plate on the visual side, or a retardation plate for compensation provided between the liquid crystal cell and the polarizing plate on the visual side can be appropriately arranged. By the way, for improving the luminance, optical layers usually arranged between back lights and liquid crystal cells, and each comprising a plurality of thin polymer films laminated with each other can also be arranged (JP-A-4-268505, PCT International Publication No. 95/17691).

The above-mentioned retardation plate for compensation is provided for compensating the wavelength dependence of birefringence to improve the visibility. In the present invention, it is arranged between the polarizing plate on the visual side and/or the back light side and the liquid crystal cell as needed. As the retardation plate for compensation, an appropriate retardation plate can be used according to the wavelength region, and it may be formed in one layer or as a laminated layer of tow or more retardation layers. The retardation plates for compensation can be obtained as the oriented films or the liquid crystal layers exemplified with respect to the above-mentioned ¼ wavelength plates.

EXAMPLE 1

A solution of 20% by weight of an acrylic thermotropic cholesteric liquid crystal polymer in tetrahydrofuran was applied with a wire bar onto a surface of a 50 μm thick cellulose triacetate film rubbing-treated with polyvinyl alcohol (about 0.1 μm in thickness). After heat orientation at 160±2° C. for 5 minute, the coated film was allowed to cool at room temperature to obtain a 2 μm thick polarizer having a circularly polarized light separation layer through which left circularly polarized light having a selective reflection wavelength region of 500 to 600 nm was transmittable.

Then, a ¼ wavelength plate having a front retardation of 140 nm and an $N_z$ of 1, which was formed of an oriented polycarbonate film, was adhered to the above-mentioned circularly polarized light separation layer by means of a 20 μm thick acrylic adhesive layer to obtain an optical element, and a surface light source was arranged under the above-mentioned polarizer to obtain a lighting device. The surface light source comprises a 4 mm thick acrylic light conductive plate on the back face of which dots were printed, a 3 mm diameter cold cathode arranged on the side face of the light conductive plate, an aluminum-deposited film surrounding the side face of the light conductive plate and the cold cathode, and a reflection sheet formed of a foamed polyester film, which was disposed under the above-mentioned dots. This surface light source was disposed under the circularly polarized light separation layer with the interposition of a 20 μm thick acrylic adhesive layer, and integrally laminated therewith by pressing.

EXAMPLE 2

A lighting device was obtained in accordance with Example 1 with the exception that a prism sheet was disposed on the light conductive layer.

EXAMPLE 3

In accordance with Example 1, two kinds of polarizers having 5-μm thick circularly polarized light separation layers different from each other in the mesogen ratio were obtained. One of the circularly polarized light separation layers transmitted left circularly polarized light having a selective reflection wavelength region of 400 to 470 nm, and the other transmitted left circularly polarized light having a selective reflection wavelength region of 600 to 700 nm. The two kinds of polarizers were placed one over the other so that the liquid crystal polymer layers faced each other, and introduced between laminating rolls heated at 130° C. to obtain a polarizer comprising a circularly polarized light separation layer having a selective reflection wavelength region of 400 to 700 nm in which the liquid crystal polymer layers were laminated with each other in the close contact state. Then, a ¼ wavelength plate having a front retardation of 135 nm and an $N_z$ of 0.5, which was formed of an oriented polycarbonate film, was adhered to the side larger in helical pitch thereof by means of a 20 μm thick acrylic adhesive layer to obtain an optical element. Using the resulting optical element, a lighting device was obtained in accordance with Example 1.

EXAMPLE 4

A lighting device was obtained in accordance with Example 2 with the exception that a prism sheet was disposed on the light conductive layer.

Comparative Example 1

A circularly polarized light separation layer was formed in accordance with Example 1 with the exception that heat orientation was conducted for 2 minutes, thus obtaining a polarizer, an optical element and a lighting device.

Comparative Example 2

A lighting device was obtained in accordance with Comparative Example 1 with the exception that a prism sheet was disposed on the light conductive layer.

Comparative Example 3

A circularly polarized light separation layer was formed in accordance with Example 2 with the exception that the scatter of the heat orientation temperature was increased to 160±20° C., thus obtaining a polarizer, an optical element and a lighting device.

Comparative Example 4

A lighting device was obtained in accordance with Comparative Example 3 with the exception that a prism sheet was disposed on the light conductive layer.

Evaluation Tests

Optical Characteristics

For the polarizers obtained in Examples and Comparative Examples, the haze, the parallel light transmittance, the total light transmittance, the diffusion transmittance, the mirror reflectance, the diffusion reflectance and the mirror reflection fraction, and the in-plane dispersion thereof were examined with an NDH-20D tester manufactured by Nippon Denshoku Kogyo Co., Ltd. Results thereof are shown in Table 1.

Degree of Improvement in Luminance, Chromaticity Difference and Uneven Display

A polarizing plate was disposed on the light outgoing side of each of the lighting devices obtained in Examples and Comparative Examples, adjusting the axis angle so as to show the maximum luminance, and the luminance and the chromaticity ($x_1$, $y_1$) in the front (vertical) direction thereof and their scatter were examined with a BM-7 tester manufactured by Topcon Co., Ltd. Taking as 100 a front luminance in the state in which the lighting device had no optical element, the degree of an improvement in luminance was determined. Further, the chromaticity difference was calculated from the chromaticity ($x_0$, $y_0$) in the front direction in the state in which the lighting device had no optical element, according to the following equation:

$$\text{Chromaticity Difference}=\{(x_1-x_0)^2+(y_1-y_0)^2\}$$

Further, the uneven display was examined by visual observation on the polarizer. Results thereof are shown in Table 2.

TABLE 1

| | Example | | | | Comparative Example | | | |
|---|---|---|---|---|---|---|---|---|
| | 1 | 2 | 3 | 4 | 1 | 2 | 3 | 4 |
| Haze (%) | 4 ± 2 | 4 ± 2 | 4 ± 2 | 4 ± 2 | 24 ± 5 | 24 ± 5 | 10 ± 10 | 10 ± 10 |
| Parallel Light Transmittance (%) | 51 ± 5 | 51 ± 5 | 53 ± 4 | 53 ± 4 | 37 ± 8 | 37 ± 8 | 39 ± 17 | 39 ± 17 |
| Total Light Transmittance (%) | 53 ± 7 | 53 ± 7 | 55 ± 6 | 55 ± 6 | 49 ± 9 | 49 ± 9 | 48 ± 24 | 48 ± 24 |
| Diffusion Transmittance (%) | 2 ± 1 | 2 ± 1 | 2 ± 1 | 2 ± 1 | 12 ± 4 | 12 ± 4 | 9 ± 7 | 9 ± 7 |
| Mirror Reflectance (%) | 35 ± 7 | 35 ± 7 | 40 ± 4 | 40 ± 4 | 20 ± 8 | 20 ± 8 | 23 ± 13 | 23 ± 13 |
| Diffusion Reflectance (%) | 14 ± 7 | 14 ± 7 | 10 ± 3 | 10 ± 3 | 22 ± 7 | 22 ± 7 | 24 ± 16 | 24 ± 16 |
| Mirror Reflection Fraction (%) | 71 ± 9 | 71 ± 9 | 80 ± 5 | 80 ± 5 | 48 ± 10 | 48 ± 10 | 49 ± 18 | 49 ± 18 |

TABLE 2

| | Degree of Improvement in Luminance | Chromaticity Difference | Uneven Display |
|---|---|---|---|
| Example 1 | 128 ± 1 | 0.022 ± 0.002 | Little observed |
| Example 2 | 115 ± 1 | 0.024 ± 0.002 | Little observed |
| Example 3 | 155 ± 2 | 0.011 ± 0.002 | Little observed |
| Example 4 | 134 ± 2 | 0.009 ± 0.002 | Little observed |
| Comparative Example 1 | 123 ± 1 | 0.021 ± 0.002 | Little observed |
| Comparative Example 2 | 109 ± 1 | 0.023 ± 0.002 | Little observed |
| Comparative Example 3 | 152 ± 7 | 0.010 ± 0.010 | Remarkable |
| Comparative Example 4 | 123 ± 5 | 0.007 ± 0.009 | Remarkable |

What is claimed is:

1. A polarizer having a function of separating incident light into polarized light through reflection and transmission, which has (a) a haze of 10% or less, or (b) a ratio of parallel transmitted light to incident light of 40 to 60%, (c) a ratio of mirror reflected light to the incident light of 25% or more, (d) a ratio of diffusion reflected light to the incident light of 20% or less or (e) a fraction of mirror reflected light to the whole reflected light of 60% or more.

2. The polarizer according to claim 1, wherein (a) the in-plane dispersion of the haze is 6% or less, or (b) the in-plane dispersion of the ratio of parallel transmitted light is 15% or less, (c) the in-plane dispersion of the ratio of mirror reflected light is 10% or less, (d) the in-plane dispersion of the ratio of diffusion reflected light is 10% or less or (e) the in-plane dispersion of the fraction of mirror reflected light is 15% or less.

3. The polarizer according to claim 1, wherein the ratio of transmitted light to incident light is from 40% to 65%.

4. The polarizer according to claim 3, wherein the in-plane scatter of the ratio of transmitted light is 15% or less.

5. The polarizer according to claim 1, wherein the ratio of diffusion transmitted light to incident light is 10% or less.

6. The polarizer according to claim 5, wherein the in-plane dispersion of the ratio of diffusion transmitted light is 6% or less.

7. The polarizer according to claim 1, wherein the function of separating incident light into polarized light through reflection and transmission is based on a Grandjean-oriented cholesteric liquid crystal layer.

8. The polarizer according to claim 7, wherein helical pitch in Grandjean orientation of the cholesteric liquid crystal layer changes in the direction of thickness.

9. The polarizer according to claim 7, wherein the cholesteric liquid crystal layer composed of a laminated product of two or more cholesteric liquid crystal polymer layers different in center wavelengths of reflected light.

10. An optical element comprising the polarizer according to claim 1, and a ¼ wavelength formed by one or two or more retardation layers disposed on at least one side thereof.

11. The optical element according to claim 10, wherein linearly polarized light having a specified polarization axis is transmitted, and the other light is reflected.

12. The optical element according to claim 10, wherein the retardation layer is composed of one or two or more liquid crystal polymer layers.

13. The optical element according to claim 12, wherein the liquid crystal polymer layer is formed of a liquid crystal polymer of twisted orientation.

14. The optical element according to claim 10, wherein a polarizing plate containing a dichroic substance is disposed on the ¼ wavelength plate.

15. A lighting device comprising a surface light source, and the polarizer according to claim 1 or the optical element according to claim 10 disposed thereon.

16. The lighting device according to claim 15, wherein said device has at least one prism array layer.

17. The lighting device according to claim 16, wherein two or more prism array layers are arranged in a state in which arranging directions of prism arrays in the upper and lower layers intersect each other.

18. A liquid crystal display comprising the lighting device according to claim 15, and a liquid crystal cell arranged on a light outgoing side thereof, with a polarizing plate intervening therebetween.

19. The polarizer according to claim 1, comprising constituent layers which are all or partly adhered by means of adhesive layers.

20. The optical element according to claim 10, comprising constituent which layers are all or partly adhered by means of adhesive Layers.

21. The lighting device according to claim 15, comprising constituent which layers are all or partly adhered by means of adhesive layers.

22. The liquid crystal display according to claim 18, comprising the constituent layers which are all or partly adhered by means of adhesive layers.

*23. A polarizer having a function of separating incident light into polarized light through reflection and transmission, which has (a) a haze of 10% or less, (b) a ratio of parallel transmitted light to incident light of 40 to 60%, (c) a ratio of mirror reflected light to the incident light of 25% or more, (d) a ratio of diffusion reflected light to the incident light of 20% or less, and (e) a fraction of mirror reflected light to the whole reflected light of 60% or more.*

*24. The polarizer according to claim 23, wherein (a) the in-plane dispersion of the haze is 6% or less, (b) the in-plane dispersion of the ratio of parallel transmitted light is 15% or less, (c) the in-plane dispersion of the ratio of mirror reflected light is 10% or less, (d) the in-plane dispersion of the ratio of diffusion reflected light is 10% or less, and (e) the in-plane dispersion of the fraction of mirror reflected light is 15% or less.*

*25. The polarizer according to claim 23, wherein the ratio of transmitted light to incident light is from 40% to 65%.*

*26. The polarizer according to claim 25, wherein the in-plane scatter of the ratio of transmitted light is 15% or less.*

*27. The polarizer according to claim 23, wherein the ratio of diffusion transmitted light to incident light is 10% or less.*

*28. The polarizer according to claim 27, wherein the in-plane dispersion of the ratio of diffusion transmitted light is 6% or less.*

*29. The polarizer according to claim 23, wherein the function of separating incident light into polarized light through reflection and transmission is based on a Grandjean-oriented cholesteric liquid crystal layer.*

*30. The polarizer according to claim 29, wherein helical pitch in Grandjean orientation of the cholesteric liquid crystal layer changes in the direction of thickness.*

*31. The polarizer according to claim 29, wherein the cholesteric liquid crystal layer composed on a laminated product of two or more cholesteric liquid crystal polymer layers different in center wavelengths of reflected light.*

*32. An optical element comprising the polarizer according to claim 23, and a ¼ wavelength formed by one or two or more retardation layers disposed on at least one side thereof.*

*33. The optical element according to claim 32, wherein linearly polarized light having a specified polarization axis is transmitted, and the other light is reflected.*

*34. The optical element according to claim 32, wherein the retardation layer is composed of one or two or more liquid crystal polymer layers.*

*35. The optical element according to claim 34, wherein the liquid crystal polymer layer is formed of a liquid crystal polymer of twisted orientation.*

*36. The optical element according to claim 32, wherein a polarizing plate containing a dichroic substance is disposed on the ¼ wavelength plate.*

*37. A lighting device comprising a surface light source, and the polarizer according to claim 23 or the optical element according to claim 32 disposed thereon.*

*38. The lighting device according to claim 37, wherein said device has at least one prism array layer.*

*39. The lighting device according to claim 38, wherein two or more prism array layers are arranged in a state in which arranging directions of prism arrays in the upper and lower layers intersect each other.*

*40. A liquid crystal display comprising the lighting device according to claim 37, and a liquid crystal cell arranged on a light outgoing side thereof, with a polarizing plate intervening therebetween.*

*41. The liquid crystal display according to claim 40, comprising the constituent layers which are all or partly adhered by means of adhesive layers.*

*42. The lighting device according to claim 37, comprising constituent which layers are all or partly adhered by means of adhesive layers.*

*43. The optical element according to claim 32, comprising constituent which layers are all or partly adhered by means of adhesive layers.*

*44. The polarizer according to claim 23, comprising constituent layers which are all or partly adhered by means of adhesive layers.*

* * * * *

UNITED STATES PATENT AND TRADEMARK OFFICE

CERTIFICATE OF CORRECTION

PATENT NO. : RE 38,500 E
DATED : April 20, 2004
INVENTOR(S) : Kameyama et al.

It is certified that error appears in the above-identified patent and that said Letters Patent is hereby corrected as shown below:

Column 18,
Line 50, please correct "a ¼ wavelength" to -- a ¼ wavelength plate --;

Column 19,
Lines 13 and 16, please correct "constituent which layers are" to -- constituent layers which are --;

Column 20,
Line 9, please correct "a ¼ wavelength" to -- a ¼ wavelength plate --;
Lines 41 and 44, please correct "constituent which layers are" to -- constituent layers which are --.

Signed and Sealed this

Sixteenth Day of November, 2004

JON W. DUDAS
*Director of the United States Patent and Trademark Office*